Dec. 27, 1949   A. H. AHRNDT ET AL   2,492,824
MEAT AND BONE SAW

Filed Jan. 5, 1945   7 Sheets-Sheet 1

Inventors
Arthur H. Ahrndt
John G. Krenzke
Hendrik K. Stukart
By Spencer, Marzall, Johnston & Cook, attys.

Dec. 27, 1949　　　A. H. AHRNDT ET AL　　　2,492,824
MEAT AND BONE SAW

Filed Jan. 5, 1945　　　　　　　　7 Sheets-Sheet 5

Dec. 27, 1949 — A. H. AHRNDT ET AL — 2,492,824
MEAT AND BONE SAW
Filed Jan. 5, 1945 — 7 Sheets-Sheet 6

Inventors
Arthur H. Ahrndt
John G. Krenzke
Hendrik Stukart
By: Spencer, Marzall, Johnston & Cook, Attys Patented Dec. 27, 1949

2,492,824

UNITED STATES PATENT OFFICE 2,492,824

MEAT AND BONE SAW

Arthur H. Ahrndt, John G. Krenzke, and Hendrik Stukart, La Porte, Ind., assignors to U. S. Slicing Machine Company, Inc., a corporation of Indiana Application January 5, 1945, Serial No. 571,398

4 Claims. (Cl. 146—88)

This invention relates to a machine for sawing meat, bone, and fish, and any other substance which may be cut by a continuously operating saw.

An important object of the invention is the provision of a new and novel meat, bone and fish saw which is compact and sturdy in construction, which is efficient in operation, which is unlikely to get out of order, which is safe in operation, and which can be easily and readily cleaned.

A further object of the invention is the provision of a saw of the above type wherein the operation of the saw is controled by a foot pedal conveniently located at the front of the machine, which foot pedal not only turns on and shuts off the electric motor but also operates a control switch for controlling a lighting element juxtaposed with respect to the cutting surface of the saw, whereby a light may be directed at an operative position on the substance.

A further object of the invention resides in the construction of a sliding table having an adjustable body support for sliding the table.

A still further object of the invention resides in new and novel means for effecting a flush substance surface comprising various table tops, interfitting but removable, so as to provide a smooth work surface and permit the parts to be readily removed for cleaning or otherwise.

Still another object of the invention resides in novel mounting for the saw pulleys to effect ready adjustment and to permit easy cleaning.

A still further object resides in the provision of a new and improved, easy sliding, adjustable end plate construction.

Still another object resides in the provision of slotted blade block guides to provide guides and backing for the saw to maintain the saw in proper position to prevent buckling thereof, the blocks being removable for cleaning purposes.

Other objects of the invention reside in a hinged top door covering the upper blade section, permitting quick blade exchange or cleaning; a hinged lower right section for permitting quick removal of the blade and easy cleaning thereof; a convenient knob and indicator guide for tightening the blade to the proper tension; easy removal of various parts, making it possible and convenient to get to all working parts for adjustment and replacement; the enclosure of all working parts; the adjustment of the belt to compensate for wear; the general arrangement, construction and location of the parts to effect a sturdy, efficiently operating device capable of being disassembled for adjustment, wear, cleaning, etc.; and the provision of a guide element for the saw which is adjustable to protect the operator from such part of the saw as is not being actually employed for the cutting of the meat.

Numerous other objects and advantages will be apparent throughout the progress of the following specification.

The accompanying drawings illustrate a selected embodiment of the invention and the views therein are as follows:

Fig. 1 is a detail perspective view of the meat and bone saw of the invention;

Fig. 1a, is a detail perspective view of part of the main table top and showing the saw guide block in position;

Fig. 1b is a detail perspective view of the saw guide block shown in Fig. 1a;

Fig. 1c is a detail plan view showing the saw guide block in position;

Fgi. 5 is a detail vertical sectional view looking from the front toward the rear, the view being at right angles to Fig. 3;

Fig. 6 is a detail sectional view on the line 6—6 of Fig. 5;

Fig. 7 is a detail sectional view on the line 7—7 of Fig. 2;

The particular meat and bone saw herein disclosed for the purpose of illustrating the invention comprises a relatively rectangular supporting base 1, which may be made of sheet metal or it may be a casting. The body of the base has a relatively square top, there being provided a downwardly inclined, forwardly extending part 2. The base also has a flat top 3 upon which there is secured firmly and rigidly a main frame structure 4. The main frame 4 is preferably made of sheet metal, properly configurated, and rests on the base 1, being secured to the base by means of bolts passing through angulated flanges 5 on the main frame and resting on top of the flat top surface 3 of the base 1.

The main frame 4 includes a front wall 6, with in-turned side sections 7 and 8, which form parts of the side walls 9 and 10, respectively. A rear wall section 11 includes a bent or turned section 12 which is spaced from the section or part 8 and forms part of the left side wall 10. The sections 7 and 8 are turned from the front wall 6, and the section 12 on the rear wall 11, and are provided with in-turned integral flanges to strengthen the frame and add rigidity thereto. A top plate 13 has interfitting relationship with the front wall 6, the rear wall 11, and the section parts or posts 8 and 12 which form the left end or side wall 10, being secured rigidly to those parts such as by welding, Figs. 1, 3 and 5.

Figure 2:
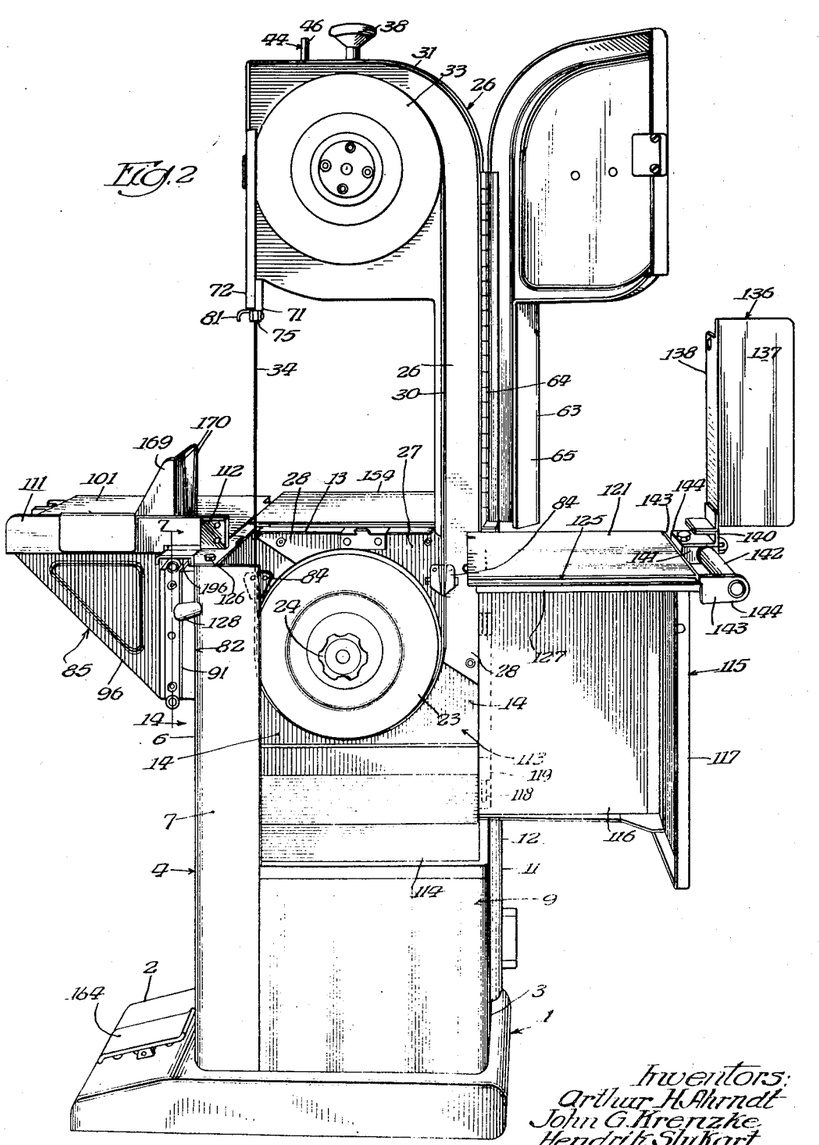
Fig. 2 is a detail right hand elevational view, some of the parts being shown in open position.
Figures 3, 4:
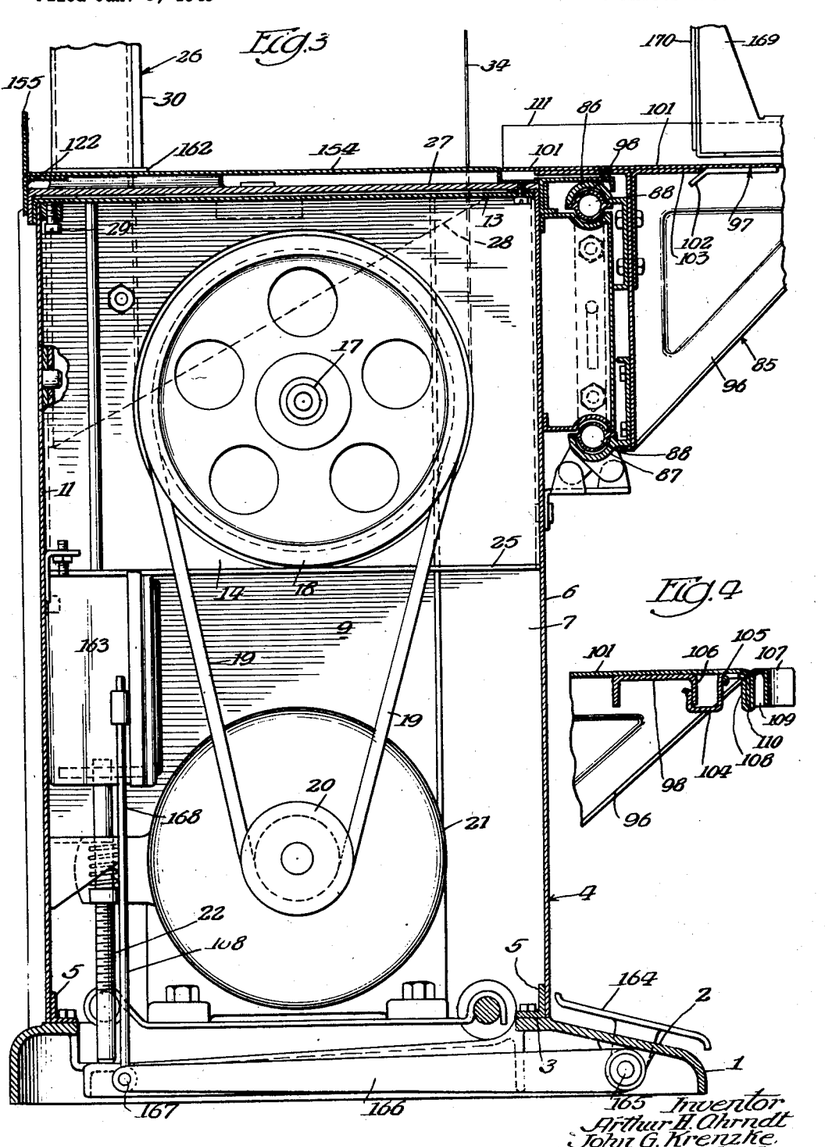
Fig. 3 is a detail vertical sectional view looking from the left side toward the right side.
Fig. 4 is a detail vertical sectional view showing the extreme forward end of the slidable table.

The top plate 13 has an integral downwardly extending center plate 14, Figs. 2 and 3, which is welded or otherwise fastened to the front wall 6 and to the rear wall 11, there being side flanges on the center plate for that purpose. The center plate strengthens the main frame, adds rigidity thereto, and provides a support for some of the operating mechanism of the machine.

Figures 5, 6, 7:
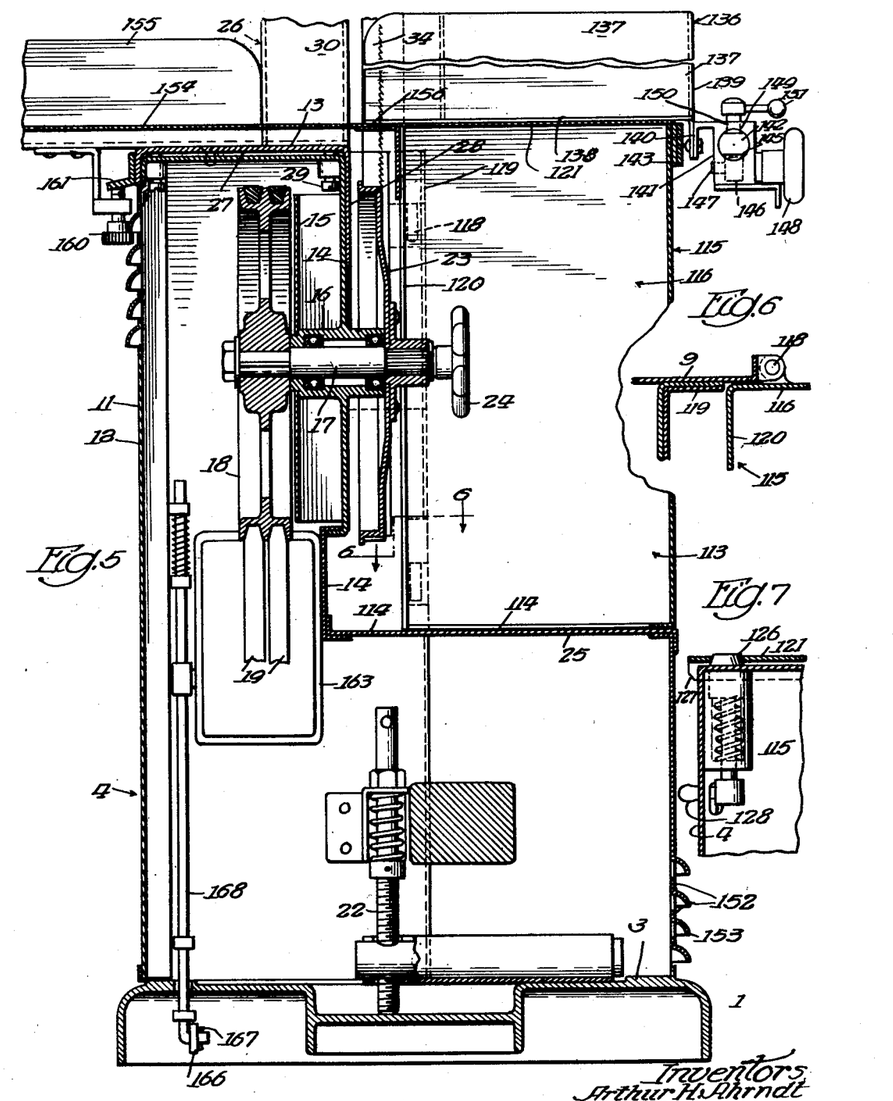

A vertically extending support 15, Fig. 5, in the form of a U-shaped member or a channel member, is welded to one side of the center plate, and this support has an opening therein which corresponds with a similar opening in the center plate 14 to receive a tubular bearing 16 in which there is revolubly mounted a drive shaft 17.

A driven pulley 18, Fig. 5, is fixed to the drive shaft 17, and this pulley is driven by V-belts 19, 19 from a motor pulley 20 on the shaft of an electric motor 21, Fig. 3. The motor 21 has its base pivotally connected to the base 1 of the machine and is adjustably supported by a screw member 22 which is pivoted to a part of the frame and which acts as a belt tightener. The pulleys 18 and 20 and the V-belts 19 are arranged on one side of the center plate 14, while a lower driven saw pulley 23 is mounted on the other side of the center plate 14, Figs. 2 and 5. the saw pulley 23 being removably supported and driven by the drive shaft 17 which protrudes the necessary distance beyond the face of the center plate 14 to make a proper driving connection. The drive shaft 17 is splined to co-operate with splines on the pulley 23 so as to drive properly the pulley 23. The extreme outer end of the drive shaft 17 is threaded to receive threadedly a hand wheel 24, Figs. 2 and 5, so as to mount removably the driven pulley 23 on the splines of the drive shaft 17.

A plate 25, Fig. 3, is arranged above the motor and is secured rigidly, by welding or otherwise, to the center plate 14 and to the front and rear walls 6 and 11, respectively, Figs. 3 and 5. The plate 25 has a water-tight connection with the said walls and plate so that any water, scraps or debris which may accumulate in the compartment formed by the enclosing walls and plates will be prevented from getting into the lower compartment where the motor and electrical connections are housed.

A sheet metal structure 26 is mounted upon and secured to the main frame structure 4 and includes a flanged plate 27, the under surface of which rests upon the upper surface of the top plate 13. An angularly shaped plate 28 is integral with the plate and extends downwardly from the plate 27 and is adapted to bear against and be secured to the inner face of the center plate 14, Figs. 2 and 5. The super-structure is secured to the main frame structure by fastening the plates 27 and 28 to the plates 13 and 14 in any convenient manner, such as by bolting these parts together. Flanges on the plate 28 have interfitting relationship with certain parts of the main frame, while a flange on an edge of the plate 28 is secured fixedly to the rear wall 11. The construction and relation of the parts is such as to make a rigid, non-rocking machine which will not shift or loosen during operation and which will reduce vibration to a minimum. The top of the plate 13 is provided with adjusting screws 29, Fig. 5, which engage the underside of the plate 27 so as to level the super-structure before the super-structure is bolted to the main frame 4. The super-structure 26 also includes an upstanding hollow column or post 30 which is welded to the top of the plate 27, Figs. 3 and 5. The column 30 is integral with a hollow inwardly extending head part or head housing 31 which houses and supports certain operating and adjusting mechanism required for the machine, Figs. 1, 2, 8, and 10.

Figures 8, 9:
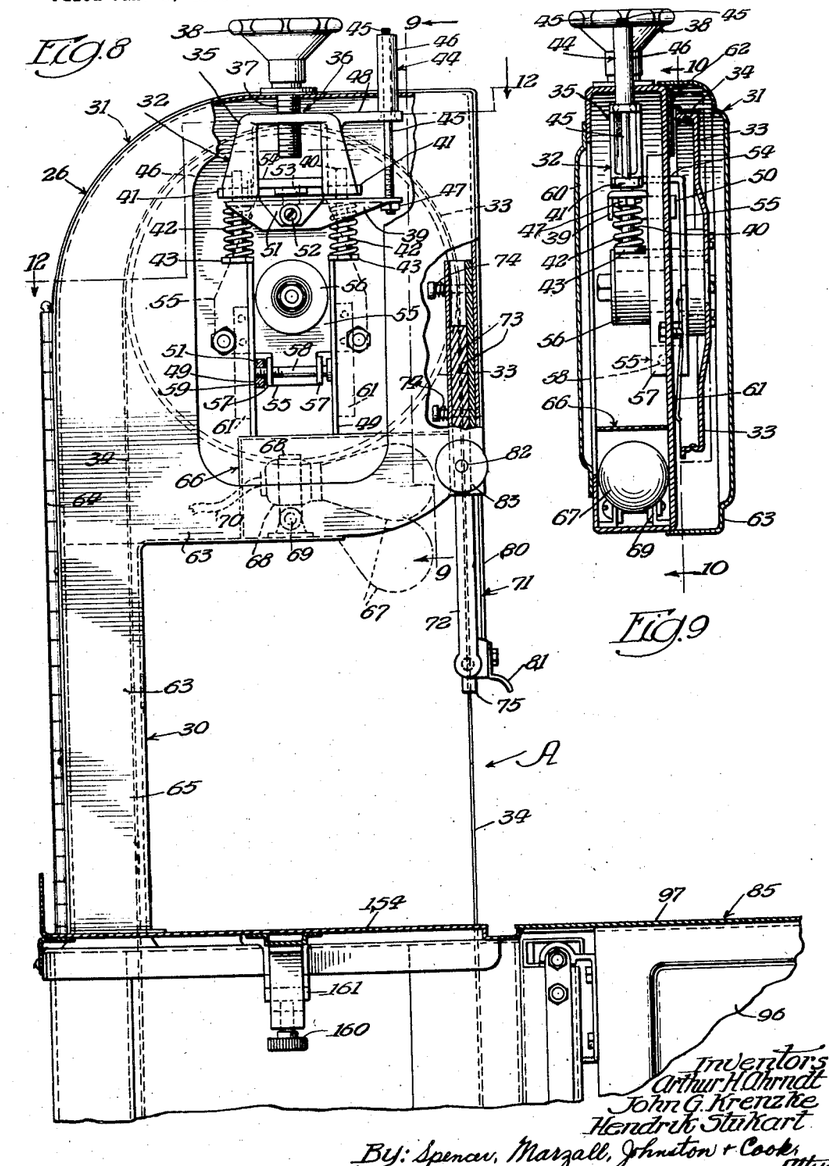
Fig. 8 is a detail vertical sectional view on the line 8—8 of Fig. 1.
Fig. 9 is a detail sectional view on the line 9—9 of Fig. 8.

An adjusting fixture 32, Figs. 8 and 9, for positioning the upper saw pulley 33 for the band saw 34, and for tensioning the band saw 34, is adjustable vertically in the head 31 of the super-structure 26. The fixture 32 includes an inverted U-shaped member or yoke 35 having a central threaded bore 36, Fig. 8, to engage a threaded stem 37 extending through the casing of the head 31 and carried by an adjusting hand wheel 38 arranged outside of the head, Figs. 8 and 9. A channel-shaped bridge 39 of the adjusting member or fixture 32 is located below the yoke 35 and has its upper surface facing the under sides of the legs of the yoke, Fig. 8. Bolts 40 pass through the top of the bridge 39 and through the legs of the yoke 35 and threadedly engage nuts 41 secured to or held by the legs of the yoke. Springs 42 are interposed between the heads 43 of the bolts 40 and the underside of the bridge 39 and hold resiliently the bridge 39 to the yoke 35, Figs. 8 and 9.

An indicator 44, Figs. 8 and 9, is carried by the fixture 32, and this indicator includes a vertical rod 45, and a vertically disposed tubular member 46 through which the rod 45 extends. The rod 45 threadedly engages an integral extension on the bridge 39, being held in adjusted position by a lock nut 47, Fig. 8. The tubular member 46 is rigidly secured to a rigid extension 48 at the top of the inverted U-shaped yoke 35 and is adapted to extend through an opening in the head housing and be visible from the outside, as clearly shown in Fig. 8. The rod 45 and tubular member 46 therefore are movable with the vertical movement of the adjusting fixture 32, but the rod 45 has slidable movement with respect to the tube 46 when tension is applied to the springs 42. The fixture 32 is guided vertically in the longitudinal opening in one side of the head by means of side guide flanges 49 on the head part 31, Fig. 8, and a flanged U-shaped strap 50 secured to the bridge 39, Figs. 9, 10 and 12.

A channel-shaped member 51 is arranged between the legs of the U-shaped yoke 35 and has its legs straddling the bridge 39, being pivotally connected to the bridge by means of an adjusting bolt or screw 52, Fig. 8. The member 51 and the bridge 39 have alined openings to receive a lug or plug 53 on the turned flange 54, Figs. 8 and 12, of a bearing supporting bracket 55, Figs. 9, 11 and 12. The bearing supporting bracket 55 is therefore hung and supported by the member 51 on the bridge 39 of the adjustable fixture 32. The bearing supporting bracket 55, Figs. 8 and 9, carries a bearing 56, Figs. 8, 9, and 11, for the shaft of the upper saw pulley 33.

Figures 10, 11, 12, 13:
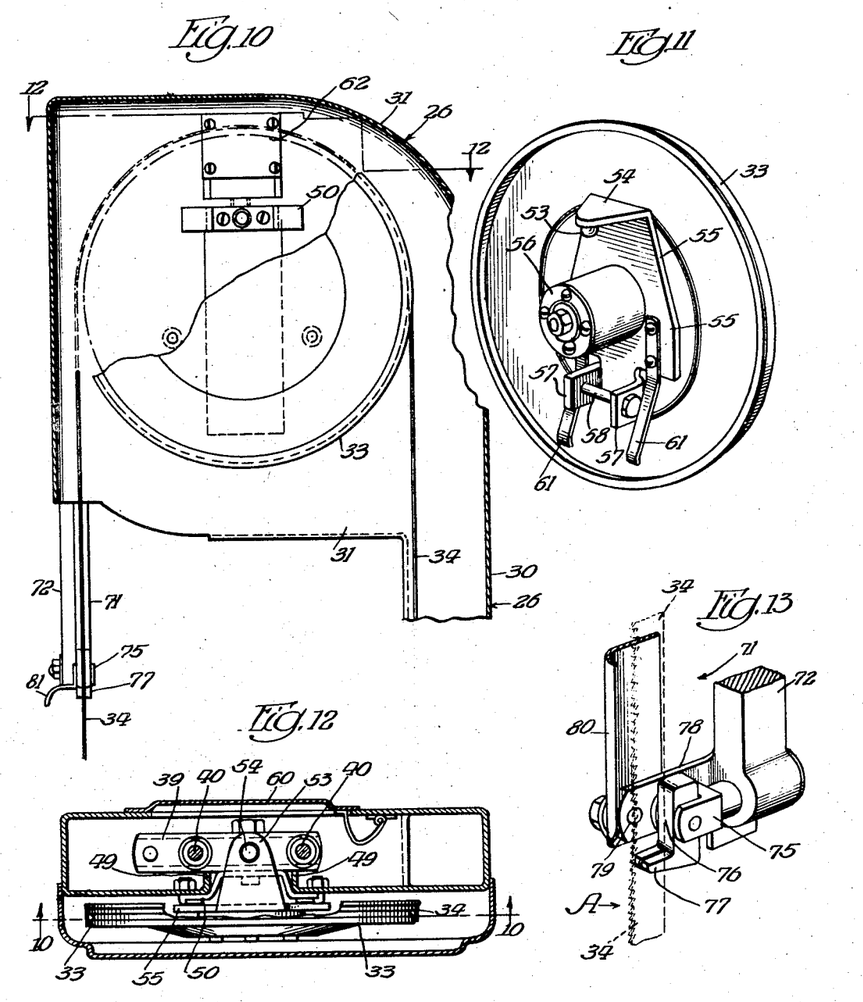
Fig. 10 is a detail sectional view looking from the right side of the machine toward the left showing the upper saw pulley, the view being on the lines 10—10 of Figs. 9 and 12.
Fig. 11 is a detail perspective view of the upper saw pulley showing the pulley mounting and some associated parts.
Fig. 12 is a detail sectional view on the lines 12—12 of Figs. 1, 8 and 10.
Fig. 13 is a detail perspective view showing some of the adjustable saw guide means.

The bearing 56, Fig. 11, is arranged in the opening below the bridge 39, Figs. 8 and 9, and is arranged for vertical adjustable movement by operation of the hand wheel 38 so as to position properly the upper saw pulley 33 and to tension properly the band saw 34. The lower end of the bracket 55, Fig. 11, is provided with turned lugs 57, 57 through which a guide bolt 58 passes, the bolt 58 being between the guide flanges 49, Fig. 8, and having a nut 59 so as to provide the proper length to fit between the guide flanges 49 whereby vertical adjustable movement of the upper saw pulley 33 may be had, but side play or movement of the bracket 55 is averted. The upper saw pulley 33 and the saw 34 are arranged on one side of a wall of the head part 31 of the super-structure, while the adjustable fixture 32 is arranged on the opposite side of said wall and within the housing of the head part, Figs. 8 and 12. A door 60 arranged in a side wall of the head 31 permits access to the adjusting fixture.

The upper saw pulley 33 has its axis directly above the axis of the lower fixed rotary saw pulley 23, Fig. 2, the band saw 34 being trained over said pulleys 23 and 33. Vertical adjustment of the upper saw pulley 33, and tensioning of the band saw 34, are accomplished by manually operating the hand wheel 38 which controls the position of the adjustable fixture 32.

The hand wheel 38 is rotated in a counter-clockwise direction to lower the adjustable fixture 32, whereupon the distance between the saw pulleys 33 and 23 is decreased, thereby permitting an endless band saw to be applied or removed easily and quickly over the corresponding saw pulleys 23 and 33. Rotation of the hand wheel 38 in a clockwise direction raises the adjustable fixture 32 and lengthens the distance between the centers of the saw pulleys 23 and 33 to position properly the pulley 33 and tension the saw 34. Raising the adjustable fixture 32, by rotation of the hand wheel 38 in a clockwise direction, causes the rod 45 and the tubular member 46 to raise with it, placing a tension on the saw 34 because the yoke 35 is held by the hand wheel shaft 37 while the bracket 55, which supports the upper saw pulley 33, is carried by the bridge 39; and inasmuch as the bridge 39 is resiliently carried by the yoke 35, through the springs 42, there will be a separation between the yoke 35 and the bridge 39 as the springs 42 are being compressed. The separation of the parts 35 and 39 by the compression of the springs 42 is reflected by the relative position of the top of the rod 45 with respect to the upper end of the tubular member 46. The change of position of the upper ends of the members 45 and 46 occurs only when tensioning is had by compressing the springs 42 because the rod 45 is connected to the bridge 39, while the member 46 is carried by the yoke 35. The proper amount of tensioning of the saw 34 can be predetermined by setting the rod 45, so that without tensioning the saw the end of the rod will project a predetermined distance above the top of the tube 46, and with tension by compressing the springs 42 sufficiently because of further clockwise rotation of the hand wheel 38, the end of the rod 45 and the end of the tube 46 will be flush. The arrangement of the rod 45 and the tube 46 which are carried by the respective parts, connected resiliently through the springs 42, comprises the indicating means 44 to indicate proper saw tensioning. The adjustable fixture 32 permits relative movement of the saw pulley centers so that a new saw can be applied easily, as well as permitting the use of a saw of somewhat greater length than necessary. The longer saw permits repairs to be made should breakage occur, as each repair necessarily may cause saw shortening.

The saw moves very rapidly during use, and should the saw break while traveling at high speed there may be danger of the upper saw pulley becoming dislodged. Also, the rapid rotative movement of the pulley 33 may cause the saw to be whipped about should it break. It is desirable, therefore, that the upper saw pulley be stopped as soon as possible should the saw break. Means are therefore provided to take care of such an emergency, and these means comprise spring steel fingers 61, Figs. 9 and 11, fixed to a face of the bracket 55. These fingers 61 engage a wall of the head housing and tend to tilt the upper saw pulley 33 out of its normal vertical plane when there is no saw trained over the saw pulleys 23 and 33. A saw trained over the pulleys 23 and 33 and tensioned properly compresses the spring fingers 61 and maintains the pulleys in the proper vertical plane. However, should the saw break during use, there will be no tension on the upper saw pulley 33 and the fingers will tilt the upper pulley 33, causing the upper edge of the pulley 33 to press against a strip of brake material 62, Fig. 9, mounted on the head housing adjacent the upper periphery of the upper saw pulley 33. Saw breakage, therefore, causes the spring fingers 61 to come into play, tilt the pulley 33 out of vertical, and bring the pulley 33 into contact with the brake material 62 to stop instantly the rotation of the pulley 33.

The super-structure 26 has a hollow shell-like cover 63, Figs. 2 and 9, which is hinged at 64 to the column 30 and to the head housing 31 and covers one side of the head housing 31 and the column or post 31. This cover 63, Fig. 2, conceals and covers the upper saw pulley 33 and one reach of the saw 34, the saw running between a face of the post 30 and the elongated part 65 of the cover 63, Figs. 2 and 8.

A casing or reflector 66, having an open bottom, Figs. 8 and 9, is carried at the bottom of the head housing 31, and this casing carries a lamp 67 fitted into a socket member 68 which is pivoted at 69 to the reflector or casing 66, Fig. 8. Electrical conductors arranged in cable 70, and leading to a source of electric supply, are electrically connected to the light socket 68. The lamp and its reflector is positioned so as to deflect light downwardly at the bared or operating part of the saw, and the pivotal mounting of the lamp socket 68 permits a lamp to be inserted or removed easily and quickly, Figs. 8 and 9.

Figures 1, 1A, 1B, 1C:
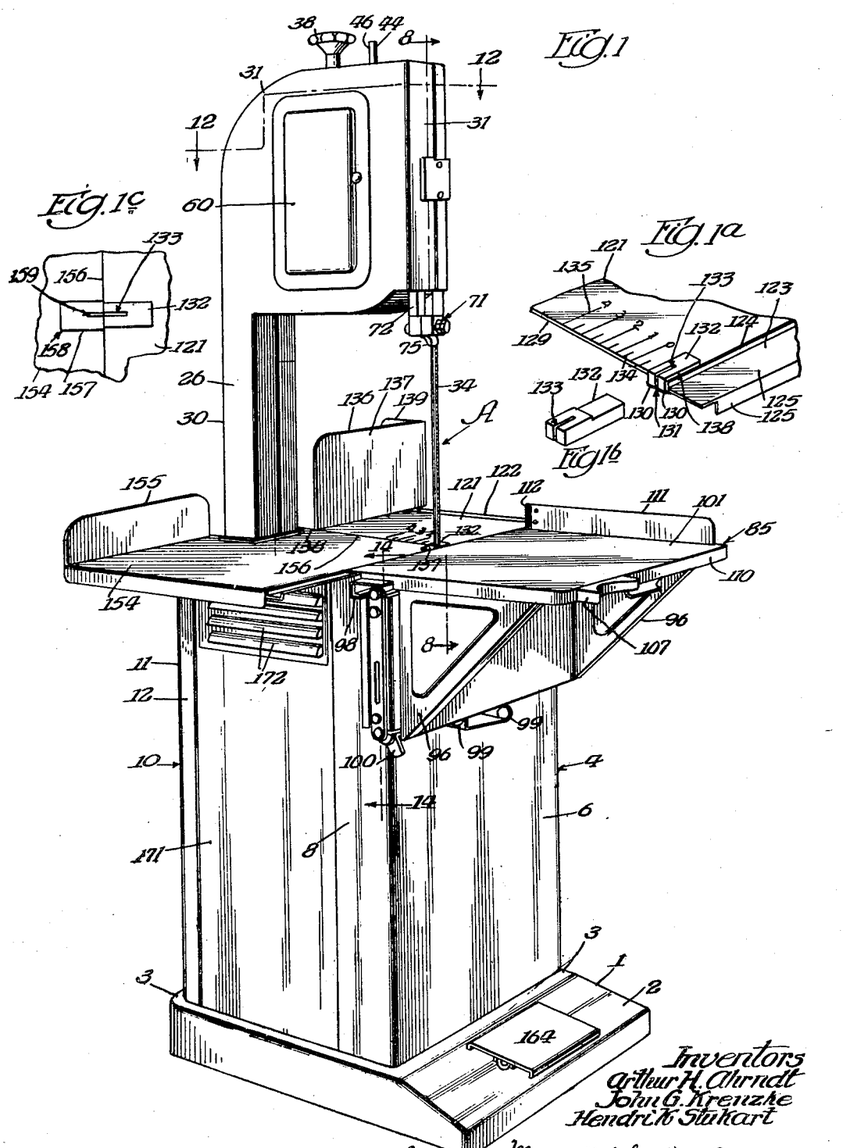

The bared or cutting portion of the saw 34 is indicated by the letter A in Figs. 1, 8, and 13, the saw being guarded by an adjustable guard member 71 which extends downwardly through the bottom of the head housing 31, Figs. 1, 8, 10, and 13. The saw guard member 71 comprises a bar 72, Fig. 13, which is slidably positioned between two members 73, 73, Fig. 8, which are urged frictionally against the bar 72 by spring members 74. The bar 72 has longitudinal limited slidable movement into and out of the head casing 31 so as to cover and guard such part of the saw not required for the actual sawing operation. The spring pressed members 73, 73 permit the bar to be retained by friction at any position within the limits of its movement. The lower end of the bar 72, Fig. 13, has fastened thereto a bifurcated member 75 which pivotally supports a backing member 76 having a split finger 77 acting respectively as a backing and guide for the saw 34 so as to prevent bowing or buckling of the saw during operation. A rigid extension 78 on the bar 72 has pivotally connected thereto at 79 a sheet metal guard 80 to cover such open part A of the saw 34 as not in actual use. The pivotal mounting of the guard 80 permits the guard to swing out of the way, and away from the saw, if desired. A finger piece 81, Figs. 8 and 2, may be attached to the bar 72 for raising or lowering the same, and, if desired, the bar 72 may be locked in raised or lowered position by a set or clamping screw 82, Fig. 8, which engages the bar 72. A hand wheel 83 may be employed for operating the locking set screw 82, Fig. 8.

Combined saw scrapers and backer 84, 84, Fig. 2, may be mounted on the center plate 14 to wipe off bone dust or other particles from the saw and provide backings for the saw to prevent buckling or bowing of the saw during use.

Figures 14, 15, 16:
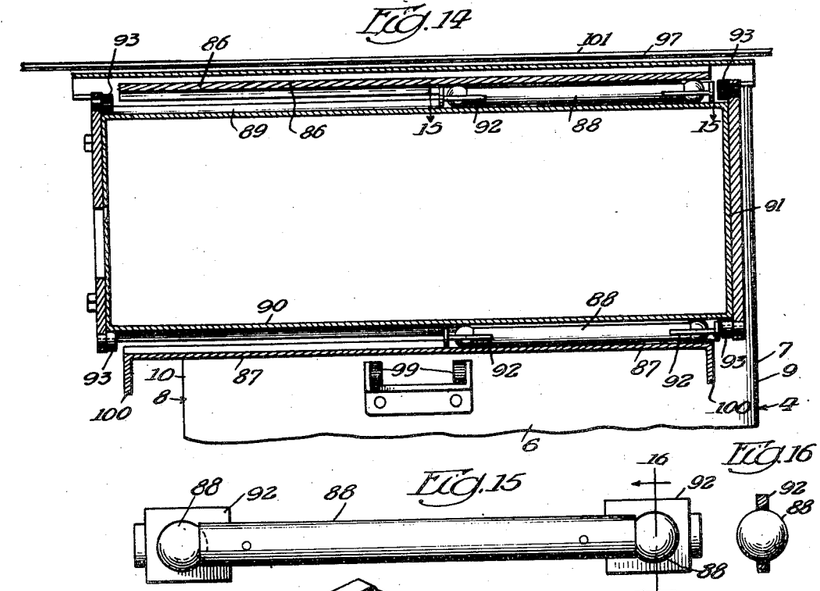
Fig. 14 is a detail sectional view through the slidable table, the view being taken on the lines 14—14 of Figs. 1 and 2.
Fig. 15 is a detail plan section on the line 15—15 of Fig. 14.
Fig. 16 is a detail sectional view on the line 16—16 of Fig. 15.
Figure 17:
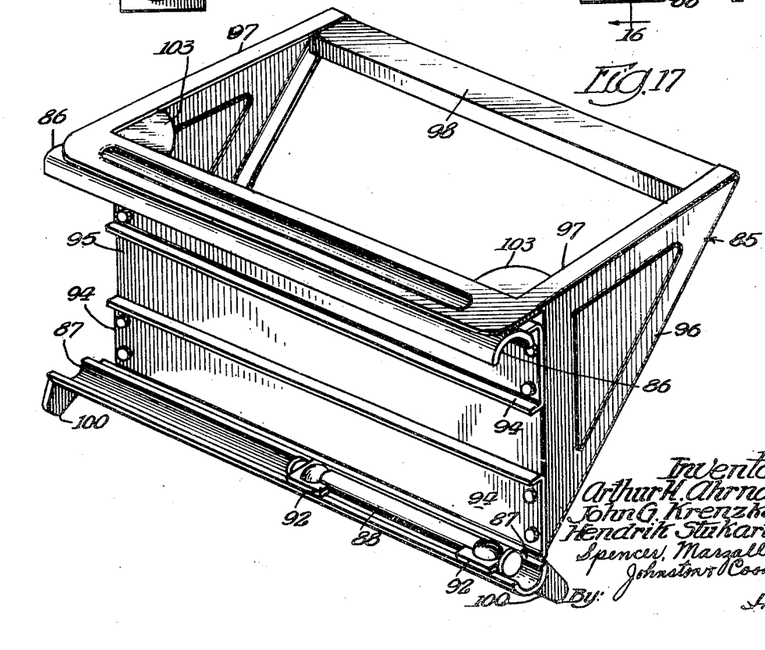
Fig. 17 is a detail perspective view of the sliding table.

A movable or slidable table support 85, Figs. 1, 2, 3 and 17, is provided with spaced upper and lower grooves or races 86 and 87, respectively, Figs. 14 and 17, which engage ball retainers 88. The retainers 88 are also receivable in upper and lower ball grooves or races 89 and 90, respectively, in a stationary vertically disposed relatively thin support 91. The ball retainers 88 include flat pieces 92, Figs. 14 to 17, which extend between the upper races 86 and 89 and the lower races 87 and 90. The ball retainers 88 are retained within the races by rubber end members or bumpers 93, Fig. 14. The races 86 and 87 of the support 85 are rigidly secured, such as by welding or otherwise, to longitudinal stiffening channels 94, Fig. 17, which are secured to the front face 95 of the table support 85. Angular members in the form of struts 96 are bent from the face 95 and a table supporting surface or face 97 is rigidly secured, as by welding, to the front face 95 and the struts 96. The surface 97 includes a front tie bar 98 in the form of a channel which is fixed to the side struts or members 96, Fig. 17.

The support 85 is slidable freely on the bearings of the bearing supports 88 and is prevented against vertical or lateral movement. The slidable movement of the table support 85 is limited by offset bumpers 99, Fig. 14, which are fixed to the front wall 6 of the main frame 4 and engage flanges 100 on the ends of the lower race way 87, Figs. 1, 14, and 17.

A demountable table top 101, Fig. 4, is provided on its under surface with locking cleats 102, Fig. 3, which engage locking gibs 103 on the support 85, Fig. 17. The table top 101 is flanged front and sides and extends over the front of the front tie bar 98, Fig. 4, and over the sides of the angular struts 96, Fig. 1. A locking member 104, Fig. 4, is hinged at 105 to the underside of the table top 101 and clips over a leg 106 of the front tie member 98.

A removable pusher 107, Figs. 1 and 4, for leg operation to shift the table 85, 101, is provided with a resilient flange 108, Fig. 4, spaced from the body 109 to provide a groove into which the front flange 110 of the table top extends. The front of the pusher is rounded out to receive the upper part or thigh of the operator's leg so that the operator, by standing against the table and leaning from one side to the other, may slide the table easily to and fro. An end flange 111, Figs. 1, 2, and 3, extends upwardly from one side of the table top so as to support the meat being cut. A fiber end 112, Figs. 1 and 2, is provided at the edge of the flange so that no injury can come to the saw as the table is moved.

A compartment 113, Figs. 2 and 5, is located immediately above a part of the compartment which houses the motor. The compartment 113 houses the lower saw pulley 23 and includes a bottom 114 which is welded along the front wall 6, the section 7 which forms part of the right side wall 9, and the section 12 of the rear wall 11, Fig. 2. The bottom plate 114 is water-tight and, therefore, the compartment 113 may be easily cleaned by washing with hot water by use of a hose. The part of the compartment not covered by the section 7 of the side wall 9 and the section 12 of the rearwall 11, is closed by a corner section 115, Fig. 2.

The corner section 115, Figs. 2, 5, and 6, includes a section or part 116 which, with the section 12, completes the rear 11, and another section or part 117 which, with the section 7, completes the right side wall 9. The corner section 115 is pivoted, by means of hinges 118, to a flange 119 formed on the section 12 of the rear wall 11, Figs. 5 and 6. A flange 120 bent from the section 116 provides a shield adjacent the saw and parallels the center plate 14, thereby forming a shield for the saw to catch bone dust as well as providing a stiffener for the corner section. The corner section 115 also includes a top plate 121, Figs. 1, 1a, and 2, having side flanges 122, Fig. 3, extending over the sections 116 and 117 which form parts of the rear wall 11 and side wall 9, respectively. The top plate 121 has its normal upper or working surface flush with the top of the slide table top 101 on the slide table support 85. One edge 123, Fig. 1a, of the top plate 121 is depressed downwardly at 124 to provide a depressed ledge 125 which fits under the slide table top 101, Fig. 3, whereupon the tables 101 and 121 will be flush when the corner section 115 is locked into closed normal operating position. The corner section 115 is locked in closed position by means of a detractible locking stop 126, Fig. 7, on a part of the main frame 4 engaging under a down-turned flange 127 on the depressed ledge 125. A handle 128, Figs. 2 and 7, is provided to retract the locking lug or stop 126 so that the corner section 115 may be swung on its hinges to open position.

A side 129 of the table 121, Fig. 1a, is provided with angle sections 130 forming a notch 131, Fig. 1a, to accommodate the band saw 34. The notch 131 is filled by a removable fiber plug 132 which is slit at 133 to permit the passage of the saw 34. This plug 132, Fig. 1b, is removably arranged in the channel socket 131 under the table top 121 and acts as a backing for the saw and prevents bowing of the saw at the bared or operating part A thereof. Graduations 134 and 135, indicative of known measurements, extend from the slit 133 so that the operator may know the thickness of a cut to be sawed from the substance, Figs. 1a and 1b.

A gauge plate 136, Figs. 1, 2, and 5, is adapted for slidable forward and rearward movement over the top face of the table 121 so that the operator may gauge the thickness of the substance to be sawed, Figs. 2 and 5. This gauge plate 136 has a face plate 137, a bottom flange 138, and a side flange 139 being bent from the face plate, Fig. 5. An inclined reinforcing plate 140, including an end flange, is secured to the back of the face plate and to the bottom and side flanges 138 and 139, respectively, Fig. 5.

An extension on the side flange 139 is connected to a fitting 141, Fig. 5, which is adapted for longitudinal movement along a rod 142. The rod 142 is pivoted between the ears 143 of a bracket 144, Fig. 2, which is fastened at the upper rear wall on the section 116 of the corner member 115. The gauge plate 136 is therefore pivotally mounted so that it may be swung out of the way when not in use, as shown in Fig. 2. The pivotal movement is accomplished by the connection of the gauge plate to the rod 142 which has pivotal movement in the ears 143 of the bracket 144. The outward pivotal movement may be limited by an angle clip on the fitting 141 engaging the underside of the bracket body 144. The lower edge of the rod 142 is provided with spaced rack teeth 145, Fig. 5, with which the teeth of a pinion 146 have co-operative engagement. The pinion is revolubly mounted inside of the fitting 141, but the pinion shaft 147 extends through the fitting for manual operation by an external hand wheel 148, Fig. 5. The gauge plate 136 may be moved manually by pulling or pushing the same along the rod 142, or it may be moved by rotating the hand wheel 148. The gauge plate 136 first may be slid by hand and then a final or micrometer adjustment may be had by turning the hand wheel 148. The top of the rod 142 has a flat surface 149, Fig. 5, with which a set screw 150 co-operates to lock the gauge plate in adjusted position, a handle 151 being fixed to the set screw 150 to operate the same.

The compartment below the corner member 115, Fig. 5, may be closed by a removable corner member 152, this member 152 being provided with louvres 153 to provide ventilation for the motor compartment.

A removable table top 154, Fig. 1, is flush with the table tops 101 and 121, the top 154 having a tongue for interfitting engagement with the top 121. A depressed channel-shaped integral side extension on the top 154 extends beneath the forward edge of the table 101 and abuts against the forward edge of the slide table support 85, Figs. 1 and 3. A flange 155 is turned up for convenience to prevent substance from falling off the top 154, while a down-turned flange extends from a side to strengthen the top 154 and add rigidity thereto as well as to eliminate sharp edges, Fig. 1. The edge 156, Figs. 1 and 5, of the top 154 abuts the edge of the table top 121, there being a removable metal plug 157 slidably arranged in a cut-away 158 in the top 154. The plug 157 is slidable in clips fastened beneath the top 154 so that it may positively be retained but removed easily and quickly. The plug 157, like the fiber plug 132, is thicker at its forward end so that the part protruding through the slot will be flush with the table top. The end of the plug 157 provides a backing for the saw, there being a slit 159 co-operating with the slit 133 to accommodate a reach of the saw. The table 154 may be locked in position by a screw 160, Figs. 5 and 8, on the underside of the table, having locking engagement with a flange 161 fastened near the top of the side wall 8. A flange 162, Fig. 3, about the post 30, and beneath which the upper side of the table 154 extends, tends to position the table 154 and hold the table in position.

A switch box 163, Figs. 3 and 5, is arranged in the lower compartment where the motor is located and to which the electric motor 21 is electrically connected, there being electric conductors, leading from a source of supply, electrically connected to the switch box. The box contains an electric switch for making and breaking contact between the conductors and the motor. The same switch is electrically connected to the conductors 70 for the lamp 67 so that when the switch is in one position the motor will be running and the lamp 67 will be lit, but when the switch is operated to break contact there will be no electric energy to the motor or the lamp. Therefore, when the motor 21 is running the lamp will be lit but when the motor is stopped the lamp will be out.

The switch in the box 163 is operated by a foot pedal or treadle 164, Fig. 3, which extends over and is fastened to a shaft 165 to which a link 166 is also fastened. The shaft 165 is rocked by the pedal 164 and the rocking movement of the shaft is transmitted to the link 166. The link 166 is pivoted at 167 to a vertically movable rod 168 which is adapted to operate the switch to "on" or "off" positions in any convenient conventional manner. The pedal 164, when pressed at its upper end, will operate the link 166 and rod 168 to operate the switch to start the motor and light the lamp, but when the treadle is depressed at its lower or forward end, the switch will be operated to shut off the motor and the light.

A hand operated meat pusher 169, Fig. 2, having ribs 170 on its front face may be provided to push the substance towards the gauge plate, particularly when the piece of substance is relatively small, Fig. 2. This pusher has a side opening which fits over the flange 111 on the slidable table top 101, being slidable manually forwardly and rearwardly over the top of the table 101, the forward slidable movement of the pusher being limited by the fiber block 112. The pusher may be removed by sliding it toward the operator (to the left, Fig. 2), whereupon it may be slipped off the flange 111.

The side wall 8, Fig. 1, has an opening therein to get into the compartment where the motor, switch, and other parts are arranged. This opening may be closed by a removable panel 171 which is provided with louvres 172 for ventilating the motor compartment.

The invention provides a sturdy, rigidly constructed meat, bone and fish saw which is relatively light in weight but which is sturdy and relatively vibrationless during operation. The saw comprises various parts which are adapted to have interfitting relationship and still provide smooth, unobstructed working surfaces, but capable of easy removal for cleaning purposes and otherwise. The construction and arrangement of the saw are such that certain parts of the machine which are likely to have bone dust, grease and other material come in contact therewith, may be readily and easily cleaned because of the water-tight connection separating such parts from other operating parts of the machine. The saw is provided with lighting means so as to direct a beam of light at the concentrated point of operation, there being novel means for controlling the operation of the light and the motor, as well as means for effecting the proper tensioning of the blade over the pulleys, with indicating means in co-operation therewith to indicate the proper saw tensioning.

Changes may be made in the form, construction and arrangement of the parts without departing from the spirit of the invention or sacrificing any of the advantages thereof, and the right is hereby reserved to make all such changes as fairly fall within the scope of the following claims.

The invention is hereby claimed as follows:

1. A meat and bone saw comprising a lower frame structure having enclosing walls, an upper superstructure mounted on the lower frame structure, an upper saw pulley rotatively mounted in the superstructure, a cooperating lower saw pulley rotatively mounted in the lower frame structure, an endless saw trained over said pulleys, means for mounting pivotally the upper saw pulley, means shifting the upper saw pulley at an angle from the vertical when the saw is not tensioned sufficiently over said pulleys, and means for arresting the rotation of the last said pulley when the latter is moved out of the vertical.

2. A meat and bone saw comprising a lower frame structure having enclosing walls, an upper superstructure mounted on the lower frame structure, an upper saw pulley rotatively mounted in the superstructure, a cooperating lower saw pulley rotatively mounted in the lower frame structure, an endless saw trained over said pulleys, means for mounting pivotally the upper saw pulley, means shifting the upper saw pulley at an angle from the vertical when the saw is not tensioned sufficiently over said pulleys, and brake means arranged for engagement with the upper pulley when the upper pulley is inclined to the vertical.

3. In combination, a pair of spaced pulleys, an endless element passing over said pulleys, means mounting one of said pulleys for adjustment in two different directions, means for effecting movement of the last said pulley in one direction to control the tension of said endless element, means operating automatically to move the pulley in another direction when the said element is not under proper tension, and means for arresting the rotation of the last said pulley when it is shifted by the said automatic means.

4. A meat and bone saw machine embodying a cutter element, a table support in proximity to the cutter element secured to a wall of the machine, opposed spaced upper and lower ball races in the support, a table mounted on the support, opposed upper and lower ball races at one end of the table and respectively cooperating with said first races, the ball races on said support being disposed between the ball races on said table, ball bearing means in said respective cooperating races, and means on the support to retain said ball bearing means.

ARTHUR H. AHRNDT.
JOHN G. KRENZKE.
HENDRIK STUKART.

REFERENCES CITED

The following references are of record in the file of this patent:

UNITED STATES PATENTS

| Number | Name | Date |
| --- | --- | --- |
| Re. 17,475 | Campbell | Oct. 29, 1929 |
| 1,384,742 | Clark | July 19, 1921 |
| 1,427,661 | Walker | Aug. 29, 1922 |
| 1,443,789 | Humphreys | Jan. 30, 1923 |
| 1,793,461 | Biro | Feb. 24, 1931 |
| 1,803,489 | Scheuren | May 5, 1931 |
| 1,841,939 | De Koning | Jan. 19, 1932 |
| 1,927,203 | De Groot | Sept. 19, 1933 |
| 2,037,283 | Strachan | Apr. 14, 1936 |
| 2,081,033 | Biro | May 18, 1937 |
| 2,143,242 | Hartman | Jan. 10, 1939 |
| 2,169,517 | Biro | Aug. 15, 1939 |
| 2,205,527 | Hartman | June 25, 1940 |
| 2,280,621 | Biro | Apr. 21, 1942 |
| 2,294,560 | Bennett | Sept. 1, 1942 |
| 2,311,268 | Tannewitz | Feb. 16, 1943 |
| 2,311,762 | Kottmann et al. | Feb. 23, 1943 |
| 2,380,700 | Lasar | July 31, 1945 |

FOREIGN PATENTS

| Number | Country | Date |
| --- | --- | --- |
| 265,889 | Great Britain | Feb. 17, 1927 |
| 23,789 | Netherlands | July 15, 1931 |